United States Patent Office 3,142,420
Patented July 28, 1964

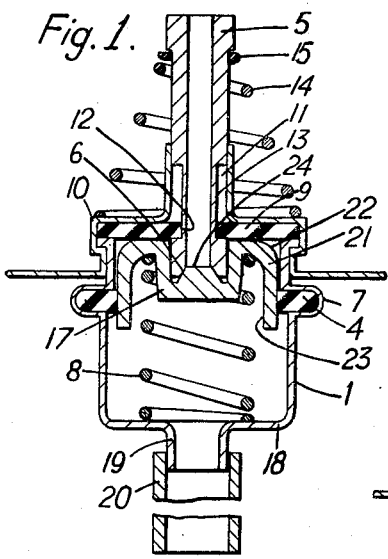

3,142,420
METERING DISPENSER FOR AEROSOL WITH
FLUID PRESSURE OPERATED PISTON
Alan Gawthrop, Clitheroe, England, assignor to Neotechnic Engineering Limited, Clitheroe, England
Original application Nov. 9, 1959, Ser. No. 851,677, now Patent No. 3,052,382, dated Sept. 4, 1962. Divided and this application Apr. 26, 1962, Ser. No. 190,426
Claims priority, application Great Britain Nov. 10, 1958
5 Claims. (Cl. 222—335)

This invention is for improvements in or relating to dispensing devices for aerosols and has for its object the provision of a metering valve for delivering metered quantities of an aerosol composition.

This application is a division of my application Serial No. 851,677, filed November 9, 1959, and now U.S. Patent No. 3,052,382, dated September 4, 1962.

Aerosol compositions generally are of two kinds, namely those in which the composition contains a propellant liquid, which vaporises very rapidly when the composition is at atmospheric pressure, and those in which the propulsion of the aerosol composition is effected by maintaining the liquid composition in a container under the pressure of a permanent gas, such as nitrogen.

Various prior constructions have been proposed for the dispensing of metered quantities of aerosol compositions having a number of moving parts and cooperating valves, and it is an object of the present invention to provide a simplified construction of dispensing device for the delivery of metered quantities of aerosol, particularly for the dispensing of aerosol compositions of the type which are ejected by the use of the pressure of a permanent gas.

According to the present invention there is provided a dispensing device for delivering metered quantities of an aerosol composition which comprises a cylindrical chamber adapted to be sealed into the neck of a container, which chamber is closed at its outer end with respect to the container by an elastic sealing washer and provided with an inlet at its inner end for communication with the interior of the container. The chamber has a sealing ring disposed circumferentially of the interior surface of its side wall at a point intermediate the outer and inner ends of the chamber, and a piston member is disposed within said chamber so as to be reciprocable therein in sealing engagement around the sides of the piston with said sealing ring. A discharge tube is mounted in said sealing washer and extends therethrough so as to be engageable with the said piston member and sealed thereby, and the discharge tube is resiliently biassed in an outward direction and is movable axially of the chamber so as, in one direction of movement, to depress the piston member to a position in which the piston member is moved past the sealing ring and is no longer sealed thereby, and in the other direction of movement, to be separable from the piston member after the piston member has been sealed by the sealing ring. By this construction, the metered quantity of liquid in the outer part of the chamber is vented through the discharge tube to the atmosphere.

A feature of the invention consists in that the discharge tube has in the outer surface thereof a circumferential recess the length of which is greater in the axial direction of the discharge tube than the thickness of the sealing washer, so that a lost motion connection is provided between the discharge tube and the sealing washer.

The inlet at the inner end of the cylindrical chamber is preferably provided with a dip-tube for extending to the bottom of the container when the aerosol container is to be used in the upright position, that is to say, with the discharge tube upwards.

The invention is illustrated by the accompanying drawings, in which:

FIG. 1 is a sectional elevation view showing the preferred embodiment with the parts thereof in position at the start of the operation of the valve;

FIG. 2 is a view similar to FIG. 1 with the discharge tube in the fully depressed position;

FIG. 3 is a view similar to FIG. 1 with the discharge tube raised to the point where the sealing washer is no longer flexed; and FIG. 4 is a view similar to FIG. 1 with the discharge tube fully raised and the piston only partially raised.

The dispensing device comprises a cylindrical chamber 1 which is distorted at about its mid-point 7 so as to accommodate an O-ring constituting a sealing ring 4 acting as a valve in conjunction with a hollow cup-shaped piston member 21 which is positioned with the open end inwardly of the container so as to be slidable within the chamber 1. A compression spring 8 is disposed beneath the piston 21 within the chamber 1, and the chamber 1 is closed at the outer end thereof by a rubber washer 9 which is clamped or otherwise sealed in position by means of a cap 10. The cap 10 and the washer 9 each have a central hole 11, 12 respectively, through which a discharge tube 5 extends, the discharge tube having a circumferential recess 13 which has an axial length which is greater than the thickness of the sealing washer 9, so that it produces lost motion between the discharge tube 5 and the washer 9. The discharge tube 5 is spring urged in the outward direction by means of a spring 14 engaging a shoulder 15 on the discharge tube 5 and engaging the cap 10.

The bottom of the inside of the cup-shaped piston member 21 has a downwardly projecting hollow conical projection 17 which has the spring 8 engaged around it so as to hold the spring 8 in place. Within the hollow conical projection 17 is an upwardly extending conical projection 24 which is engageable with the open inner end of the discharge tube 5 so as to provide a seal. In the bottom wall 18 of the cylindrical chamber is an inlet port 19 connected to a dip-tube 20, the whole assembly being mounted in the neck of a container adapted to be filled with an aerosol composition and with a permanent gas, for example nitrogen, under pressure.

In operation, due to the pressure of the gas within the container, the whole of the cylindrical chamber 1 inwardly of the piston 21 is filled with liquid. On application of manual pressure to the discharge tube to depress it, the piston member 21 is moved downwardly in the cylindrical metering chamber 1 to a point at which the closed end 22 thereof has passed beyond the sealing ring 4, as seen in FIG. 2. The rubber washer is also distorted downwardly by the action of the end of the groove 13 on the washer 9. The open inner end 6 of the discharge tube 5 is, during this operation, sealed by contact with the projection 24 on the bottom of the inverted cup-shaped piston member 21, and remains sealed until, on its return movement, it separates from the piston member 21 as the latter engages with and is sealed by the sealing ring 4, as seen in FIGS. 3 and 4.

With the piston depressed as in FIG. 2, there is an annular opening between the piston 21 and the sealing ring 4, and under the gas pressure within the container, the liquid is forced up the dip-tube 20 into the lower part of the cylindrical chamber 1 and through the annular opening into the part of the chamber above the inverted cup-shaped piston member 21. On completion of the filling of the upper part of the cylindrical chamber 1, manual pressure on the discharge tube 5 is removed, allowing the cup-shaped piston 21 to rise to the point at which the upper end 22 of the piston 21 engages the sealing ring 4 as seen in FIG. 3. Continued outward movement of the discharge tube 5 now takes place under the influence of spring 14 acting thereon. with the result that the lower end 6 of the discharge tube 5 separates from the projection 24 on the piston 21, as seen in FIG. 4. As a result, the upper part of the cylindrical chamber 1 is now at atmospheric pressure, having been vented through the discharge tube 5, and there is a differential in pressure between the two sides of the piston due to the gas pressure within the container and the spring 8.

The piston 21 is thus forced upwardly, and during this upward movement it acts as a pump and ejects a measured quantity of liquid from the upper part of the chamber through the discharge tube 5 to the atmosphere. At the conclusion of its upward movement, the projection 24 on the piston 21 re-engages with and seals the open inner end 6 of the discharge tube 5, whereby the liquid in the container, including the liquid retained in the outer part of the cylindrical chamber 1 above the piston 21, is sealed off from contact with the atmosphere.

The inverted cup-shaped piston is the most convenient form of non-ported piston member since it can be made by pressing from sheet metal and can be readily formed with a rounded bottom portion permitting easy re-entry into engagement with the sealing ring.

The term "aerosol composition" as employed herein includes compositions other than simple liquids, such as pastes, which may be discharged in the form of coherent ribbons or streams, and viscous liquids which may be discharged in the form of a jet or a series of large drops, and is not limited to compositions which are discharged in the form of the very minute droplets normally referred to as aerosols in the art to which the present invention relates.

Usually the discharge tube will be provided with an actuator in the form of a nozzle member so constructed as to discharge the aerosol composition in the form of a jet, spray or ribbon and to provide a conveniently shaped end part to which manual pressure can be applied to operate the valve.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A dispensing device for delivering metered quantities of an aerosol composition, which comprises a cylindrical chamber adapted to be sealed into the neck of a container, an elastic sealing washer at the outer end of said chamber closing the chamber with respect to the container, said chamber having an inlet at the inner end thereof for communication with the interior of the container and having a sealing ring disposed circumferentially of the interior surface of the side wall of the chamber at a point intermediate the inner and outer ends of the chamber, a piston member disposed within said chamber so as to be reciprocable therein in sealing engagement around the sides thereof with said sealing ring, a discharge tube mounted in said sealing washer and extending therethrough and engagable with said piston member and adapted to be sealed thereby, said discharge tube being resiliently biassed in an outward direction and being movable axially of the chamber so as, in one direction of movement, to depress the piston member to a position in which the piston member is past the sealing ring and is no longer sealed by said sealing ring, and in the other direction to be separable from the piston member after the piston member has engaged the sealing ring and has been sealed thereby, whereby the metered quantity of liquid in the outer part of the chamber is pumped therethrough to the atmosphere by further outward movement of the piston member under the pressure differential on opposite sides of the piston member.

2. A dispensing device as claimed in claim 1 in which said piston member is a cup-shaped member with the open end thereof toward the inner end of said chamber, said cup-shaped member having a depending wall forming the side of the piston engaged with said sealing ring, whereby when said discharge tube depresses said cup-shaped member to a position in which the piston is past the sealing ring, it is the outermost end of the piston which has passed beyond the sealing ring.

3. A dispensing device as claimed in claim 2 further comprising a compression spring mounted within said chamber and said cup-shaped piston member for urging said piston member toward the outermost position in said chamber.

4. A dispensing device as claimed in claim 3 in which said discharge tube has on the outer surface thereof a circumferential recess the length of which in the axial direction of said discharge tube is greater than the thickness of said sealing washer, the edge of said sealing washer being engaged in said recess, the recess being disposed with the bottom edge thereof in contact with the bottom surface of said washer when said discharge tube is in the outermost position, with the greater part of the recess being disposed above the top surface of the washer, whereby a lost motion connection is formed between the discharge tube and the sealing washer.

5. A dispensing device as claimed in claim 4 in which said chamber has a dip-tube thereon forming said inlet.

References Cited in the file of this patent
UNITED STATES PATENTS

| | | |
|---|---|---|
| 2,835,417 | Kiraly | May 20, 1958 |
| 2,900,114 | Utz | Aug. 18, 1959 |

FOREIGN PATENTS

| | | |
|---|---|---|
| 1,194,379 | France | May 4, 1959 |